(12) United States Patent
Sepe (10) Patent No.: US 12,490,079 B2
(45) Date of Patent: Dec. 2, 2025

(54) SYSTEM AND METHOD FOR ATTACHING AN INTEGRATED CIRCUIT CARD TO A COMMUNICATION NETWORK

(71) Applicant: STMicroelectronics S.r.l., Agrate Brianza (IT)

(72) Inventor: Paolo Sepe, Naples (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 371 days.

(21) Appl. No.: 18/174,300

(22) Filed: Feb. 24, 2023

(65) Prior Publication Data

US 2023/0300600 A1  Sep. 21, 2023

(30) Foreign Application Priority Data

Mar. 11, 2022 (IT) .................. 102022000004766

(51) Int. Cl.
*H04W 76/19* (2018.01)
*H04W 8/18* (2009.01)
*H04W 60/04* (2009.01)

(52) U.S. Cl.
CPC .......... *H04W 8/183* (2013.01); *H04W 60/04* (2013.01)

(58) Field of Classification Search
None
See application file for complete search history.

(56) References Cited

FOREIGN PATENT DOCUMENTS

| GB | 2589724 A | 6/2021 | |
|---|---|---|---|
| WO | 2015080639 A1 | 6/2015 | |
| WO | WO-2021170974 A2 * | 9/2021 | ............ H04W 88/06 |

OTHER PUBLICATIONS

GSMA, "Remote Provisioning Architecture for Embedded UICC, Technical Specification", Version 4.0, Feb. 25, 2019, 399 pages.

* cited by examiner

*Primary Examiner* — Gary Lafontant
(74) *Attorney, Agent, or Firm* — Slater Matsil LLP (57) ABSTRACT

In accordance with an embodiment, a method includes: receiving a notification of a network loss from a mobile communication network, the notification comprising a current network loss cause; selecting a network loss event duration estimate among a plurality of network loss event duration estimates stored on an integrated circuit card and indexed according to a corresponding plurality of network loss cause indices; selecting a stored profile of a plurality of stored profiles on the integrated circuit card based on the selected network loss event duration estimate, wherein the plurality of stored profiles are associated with user subscriptions; and attaching to the mobile communication network using the selected stored profile when the selected stored profile is not already enabled.

20 Claims, 5 Drawing Sheets

SYSTEM AND METHOD FOR ATTACHING AN INTEGRATED CIRCUIT CARD TO A COMMUNICATION NETWORK

CROSS-REFERENCE TO RELATED APPLICATIONS

This application claims the benefit of Italian Patent Application No. 102022000004766, filed on Mar. 11, 2022, which application is hereby incorporated herein by reference.

TECHNICAL FIELD

Embodiments of the present disclosure relate generally to electronic devices, and more particularly to a systems and method of attaching an integrated circuit card to a communication network.

BACKGROUND

Due to new requirements of miniaturization and robustness, the industry has developed an evolution of the traditional UICC (Universal Integrated Circuit Card) cards called "embedded UICC". This evolution envisages that the UICC is soldered (or in any case made hardly accessible) in the hosting device that can be a mobile phone, a modem, a board inserted in a device, etc.

Soldering presents distinct advantages such as the possibility of reducing the size of the UICC device and hence of the modem, the improvement of the robustness of the contacts (soldered contacts are typically more reliable than interfaces between replaceable components), the increased antitheft protection.

On the other hand, soldering a UICC (or making it hardly accessible) introduces new requirements and issues that need to be addressed, such as: as the UICC is not replaceable, means should be available to allow the operator change; and specific operations (such as device repairing), that today are typically performed after the UICC removal, require a way to disable the SIM card. To address the above requirements, the industry has defined a new technological standard called "embedded UICC" or "Remote SIM provisioning".

The basic concepts of the new technological standard are as follows. One entity is defined to allow the download/enable/delete of profiles (for instance the Issuer Secure Domain Root ISD-R, see for instance "Remote Provisioning Architecture for Embedded UICC, Technical Specification, Version 1.0, 17 Dec. 2013"); the UICC may contain several mobile network operator subscriptions; each operator subscription is represented by a "profile"; and every profile may be seen as a container; the container is managed by a security domain (for instance the Issuer Secure Domain Profile ISD-P).

SUMMARY

In accordance with an embodiment, a method is disclosed for managing in an integrated circuit card, in particular an eUICC, operating in a communication device configured to communicate with a mobile communication network, the attachment to said mobile communication network in case of a network loss event of profiles enabled representing user subscriptions, stored in said integrated circuit card. The method includes: when a network loss event occurs and is signaled by a notification of network loss, obtaining a current network loss cause, in particular from the notification of network loss, selecting among estimates of the duration of network loss event stored at the integrated circuit card with the respective network loss event causes, the estimate of the duration of network loss event with network loss event cause corresponding to the current loss event causes, and selecting which stored profile in the integrated circuit card to enable if not already enabled and to attach to said mobile communication network on the basis of the value of said selected estimate of the duration of network loss event with network loss event cause corresponding to the current loss event causes.

In various embodiments, the method includes performing a communication through said communication network between one or more integrated circuit cards residing in respective communication devices and a remote server in a client server communication mode, sending to said server from one or more integrated circuit cards of communication devices attached to said communication network at the end of a network loss event a network loss terminated message comprising the type of communication device, the indication of the cause of a network loss event, an area location information and the duration, and in particular also a timestamp. The server may store the network loss terminated messages from the plurality of integrated circuit cards in a database as entries grouped by type of device and area location, and calculate an average time of network resolution for said cause, over the entries of a same group corresponding to the type of device and location within the mobile communication network. The integrated circuit card at a determined update time, in particular at startup, may request from said server on the basis of its respective type of device and area location, values of average time and corresponding cause corresponding to its device type and location, which are then, upon receival, stored as estimates of the duration of network loss event stored at the integrated circuit card in association with the corresponding network loss event cause in the integrated circuit card.

In various embodiments, said method includes: configuring the integrated circuit card to maintain a client file which is updated with said values of average time and corresponding cause corresponding to its device type and location received from the server. The file includes one or more entries comprising an indication of the cause of a network loss and an estimate of the duration of said network loss event computed as an average time of network resolution for said cause, corresponding to the type of device and location within the mobile communication network.

In various embodiments, selecting which profile stored in the integrated circuit card attaches to said mobile communication network on the basis of the value of said selected estimate of the duration of network loss event with network loss event cause corresponding to the current loss event causes includes evaluating on the basis of said estimation of duration of a network loss event if the integrated circuit card has to enable and to attach a fallback profile or to re-attach the profile currently enabled in the integrated circuit card.

In various embodiments, the network loss terminated message comprises a timestamp, and the server is configured to order the messages from the plurality of integrated circuit cards according to their timestamp value, and discard the message if the timestamp falls in a time range of a network loss due to a known cause, in particular a known network breakdown.

In various embodiments, if the estimation of the duration of the network loss event is evaluated as representative of a short temporary problem, in particular shorter than a time duration threshold, re-attachment of the currently enabled profile is attempted. Otherwise, if the estimation of duration of a network loss event is evaluated as representing a not-temporary problem, in particular longer than a time duration threshold, the integrated circuit card switches to the fallback profile.

In various embodiments, if the integrated circuit card receives said notification of network loss, in particular, the asynchronous notification "Network Rejection Event", a timer is activated. At the reception of a notification of normal service, in particular NORMAL SERVICE (EVENT DOWNLOAD—LOCATION STATUS), the timer is stopped and a message is sent comprising the type of communication device, the indication of the cause of a network loss event, an area location information and the duration, and a timestamp. The time value may be used as the duration. If a timeout occurs, no message is sent to the server.

Embodiments include a system architecture including an integrated circuit card, in particular eUICC, operating in a communication device configured to communicate with said communication network. The system may include a server associated with a database. The system may be configured for performing a communication through said communication network between one or more integrated circuit card residing in respective communication devices and a remote server in a client server communication mode. The system may be configured to perform the operations according to embodiments.

The present disclosure also describes embodiments including an integrated circuit card, in particular an eUICC, configured to perform the embodiment methods.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figures parts, elements or components which have already been described with reference to previous figures are denoted by the same references previously used in such Figures; the description of such previously described elements will not be repeated in the following in order not to overburden the present detailed description.

Figure 1:
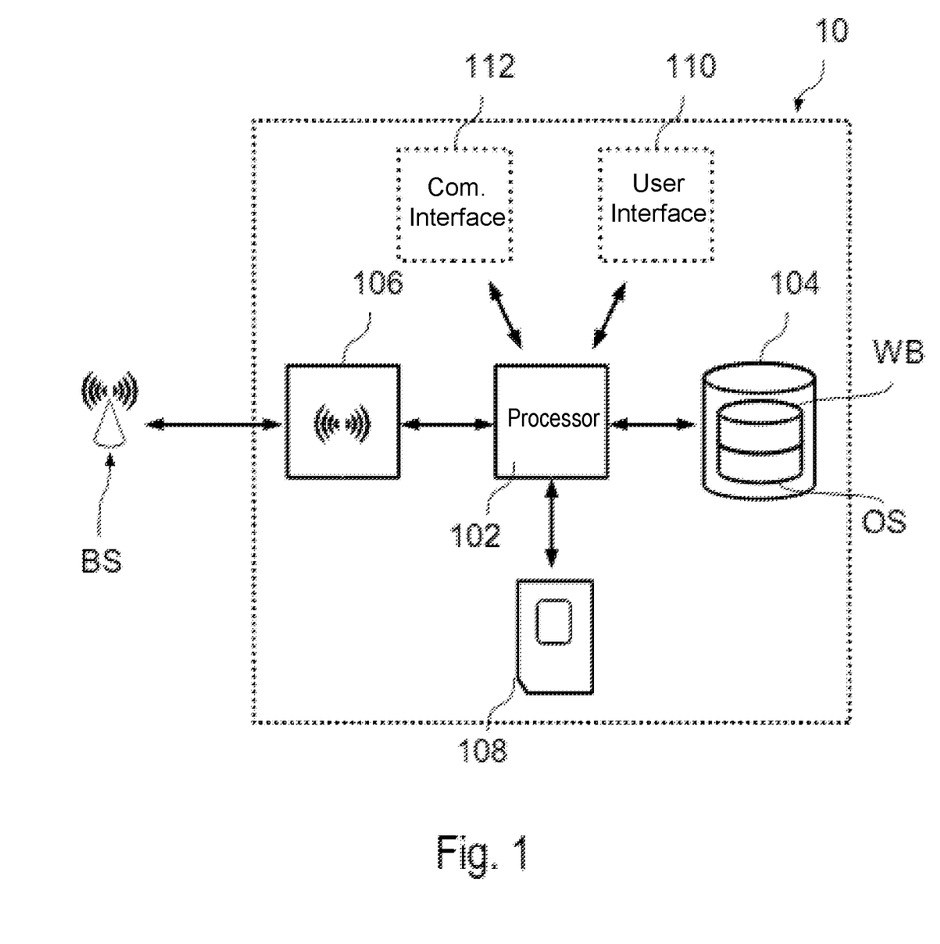
FIG. 1 illustrates a user equipment architecture.

FIG. 1 shows a possible architecture of a "user equipment" 10, such as a mobile device, e.g. a smartphone or a tablet, or a mobile communication module used in embedded systems.

Generally, the device 10 comprises one or more processors 102 connected to one or more memories 104. The device 10 comprises at least one mobile communication interface 106 for communication with a base station BS.

For example, the mobile communication interface 106 may comprise a GSM (Global System for Mobile Communications), CDMA (Code Division Multiple Access) transceiver, W-CDMA (Wideband Code Division Multiple Access), UMTS (Universal Mobile Telecommunications System), HSPA (High-Speed Packet Access) and/or LTE (Long Term Evolution) transceiver.

A mobile device often comprises a user interface 110, such as a touchscreen. Conversely, a communication module used, e.g., in embedded systems, such as alarm systems, gas meters or other types of remote monitoring and/or control systems, often does not comprise a user interface 110, but a communication interface 112 in order to exchange data with a further processing unit of an embedded system. For example, interface 112 may be a digital communication interface, such as a UART (Universal Asynchronous Receiver-Transmitter), SPI (Serial Peripheral Interface) and/or USB (Universal Serial Bus) communication interface. Processing unit 102 may be the main processor of an embedded system. In this case, interface 112 may be used to exchange data with one or more sensors and/or actuators. For example, interface 112 may be implemented by one or more analog interfaces and/or digital input/output ports of the processing unit 102.

In the memory 104 may be stored e.g., an operating system OS being executed by the processor 102 that manages the general functions of the device 10, such as the management of the user interface no and/or the communication interface 112 and the establishment of a connection to the base station BS via the interface 106. The memory 104 may also contain applications executed by the operating system OS. For example, in the case of a mobile device, the memory 104 often includes a web browser application WB.

For establishing a connection with the base station BS, device 10 is coupled to a processing unit 108 configured to manage the identity identification of the user. For example, a mobile device usually includes a card holder for receiving a card comprising a Subscriber Identity Module (SIM), which is usually called SIM card. A corresponding SIM module may also be installed directly within the device 10 as, such as an integrated circuit card, specifically a Universal Integrated Circuit Card (UICC) 108, which is a smart card often used in GSM and UMTS networks as shown in FIG. 1. The UICC ensures the integrity and security of all kinds of personal data and typically holds a few hundred kilobytes.

The UICC may be integrated directly in the device 10 and is in this case often called embedded UICC (eUICC).

For example, in a GSM network, the eUICC 108 contains a SIM application and in a UMTS network the eUICC contains a USIM application. A eUICC may contain several applications, making it possible for the same smart card to give access to both GSM and UMTS networks, and may also provide storage of a phone book and other applications.

Accordingly, the reference to a SIM module in the following of the present description is intended to include 2G, 3G, 4G and 5G SIM modules and further generations of mobile communications to which the embodiments described herein are applicable. Disclosed embodiments may also apply to cases in which such a SIM module is provided on a SIM card.

Figure 2:
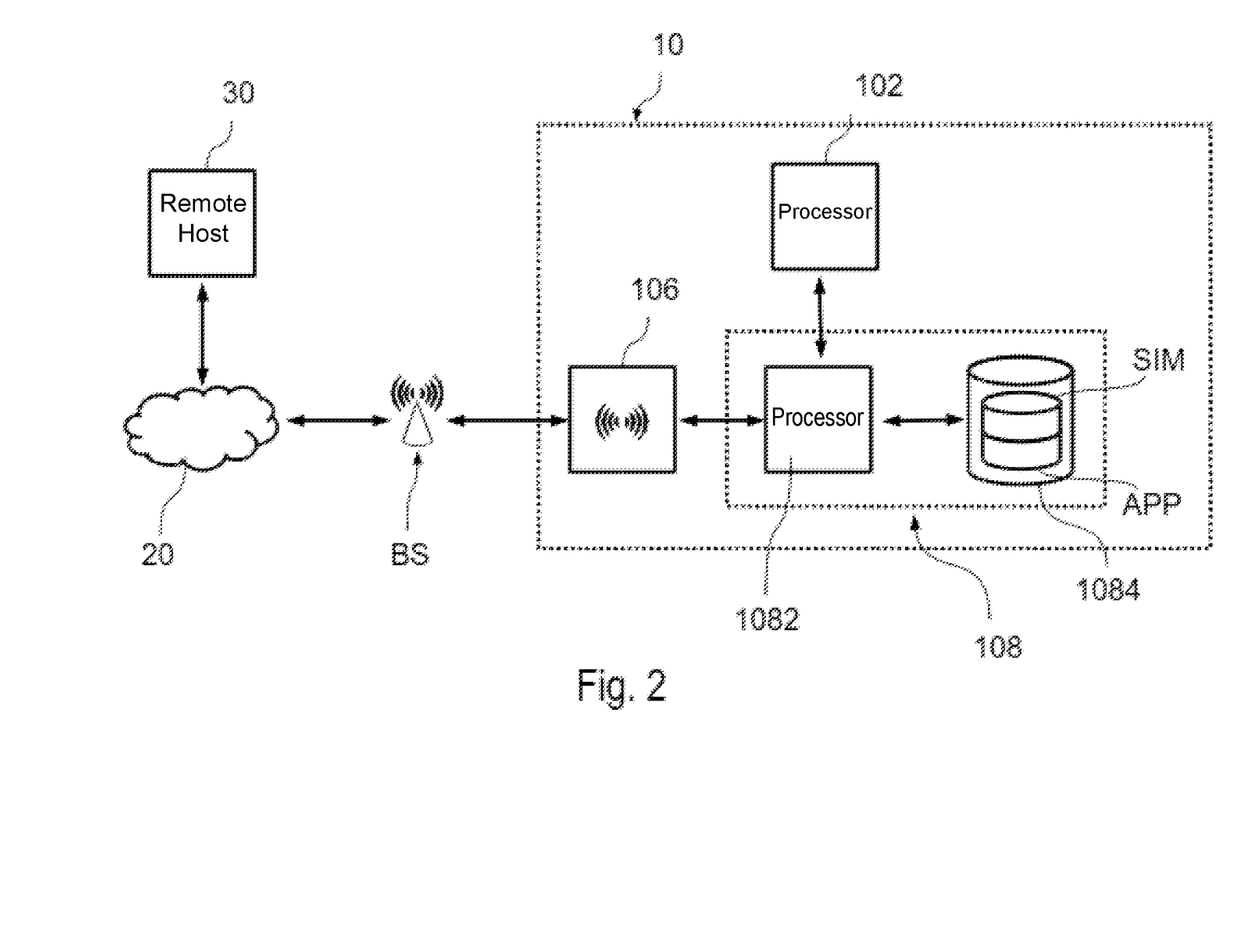
FIG. 2 illustrates a SIM module.

As shown in FIG. 2, a SIM module 108 often includes one and more processors 1082 and one or more memories 1084 for executing applications stored in the memory 1084 of the module 108. For example, the SIM module 108 may comprise in addition to the Subscriber Identity Module application (reference sign SIM in FIG. 2) at least one further application APP. For example, this application APP may be configured to communicate (directly, or indirectly via the processor 102 and possibly the operating system OS) with the mobile communication interface 106 in order to send data to and/or receive data from a remote host 30. For this purpose, the host 30 may be connected via a network 20, such as a Local Area Network (LAN) or a Wide Area Network (WAN), such as the internet, to the base station BS. Accordingly, connection between the host 30 and the UICC 108 may be established by means of the network 20, the base station BS and the communication interface 106. Generally, the communication may be initiated by the host 30 or the UICC 108. For example, the application APP may be a web server application, which receives requests from the web browser WB of a mobile device 10 and obtains respective content from a remote host 30, such as a web server. The application APP may also be an authentication application. In this case, the host 30 may send an authentication request to the UICC 108 and the UICC 108 may send an authentication response to the host 30.

As indicated, the card 108 may be an eUICC. An embedded UICC is an UICC (Universal Integrated Circuit Card) that is not easily accessible or replaceable, is not intended to be removed or replaced in the device (i.e., user equipment 10), and enables the secure changing of profiles. To this regard the card 108 may be a multi-subscription card, or SIM module, which can support a plurality of profiles.

A profile is a combination of a file structure, data and applications to be provisioned onto, or present on, an integrated card such as an eUICC and which allows, when enabled, the access to a specific mobile network infrastructure.

The state of a profile is enabled when its files and/or applications are selectable over the UICC-Terminal interface. In this context, the fallback attribute is an attribute of a Profile which, when set, identifies the Profile to be enabled by the Fall-Back Mechanism.

The Fall-Back Mechanism is activated in case of loss of network connectivity of the current Enabled Profile. The eUICC disables the current Enabled Profile and enables the Profile with Fall-Back Attribute set stored in its memory. The fallback attribute is introduced to guarantee network and service coverage to the customers of the eUICC devices with no dependences from specific network operators.

To this regard, in the specification GSMA SGP.02-v4.2 is indicated that: "Only one Profile on the eUICC can have the Fall-Back attribute set at a time," and that "A mechanism may permit to request to the eUICC to switch back to the previously enabled profile once the network connectivity has been restored."

Loss of network can be associated to different criteria and trigger conditions (e.g., direct modem driven commands, Network Rejection event, Location Status event, Provide Local information event). It is implementation-specific as to which of the above criteria is used to determine network failure in an eUICC.

In the most common approach, the fallback procedure is initiated regardless of the status of the connection (i.e., the eUICC starts the procedure and does not verify if the network is available again). Other approaches are modem driven such that the modem devices determine the conditions requiring execution of the fallback procedure.

Some embodiments of the present disclosure relate to techniques for method for managing in an integrated circuit card, in particular an eUICC, operating in a communication device configured to communicate with a mobile communication network (12), attaching to the mobile communication network (12), operating in a communication device. Some embodiments of the present disclosure relate techniques for performing a tuning of a fallback mechanism in network connectivity of a eUICC.

Some embodiments are directed to a system architecture and an integrated circuit card. Embodiments described herein includes methods and systems for managing an integrated circuit card, in particular an eUICC, operating in a communication device configured to communicate with a mobile communication network. In an embodiment, the integrated circuit card attaches to a mobile communication network. In an embodiment, enabled profiles of the integrated circuit card representing user subscriptions attach to a mobile communication network in case of a network loss event. A heuristic (e.g., a set of rules of criteria) is used to switch to a fallback profile and/or to a previous profile taking into account that the network problem could be temporary.

Under this approach, a method for managing the profile in case of network loss may include (e.g., for short temporary problem) waiting before switching to the fallback profile and remaining with the currently enabled profile. For a connection problem that requires more time to be solved (e.g., a time above a given time threshold), the system may switch immediately to the fallback profile and retry the previous profile after attaching to the network.

To apply a heuristic fallback procedure, the type of network problem is recognized and an estimated average time is needed, so that it can be decided, based on the value of the estimated duration, if it is a temporary problem, (e.g., the fallback mechanism does not need to be applied) or a problem that requires more time so that the fallback mechanism is applied immediately.

Of course, some type of network problems could be permanent. In various embodiments no heuristic is applied for permanent network problems (e.g., the fallback procedure is applied instantly without retrying previous profile attachment). Permanent problems cause the system to retry the previous profile since the currently enabled profile has permanent errors that cannot be solved. For example, when the IMSI is deleted from the HLR (e.g., no bill payment).

A Network Rejection Event, which is an event for instance reported in the standard ETSI TS 131 111 pertaining among others UMTS, LTE and USIM, issued from the network to the integrated eUICC, provides information related to the current network problem determining the network loss (e.g., device identity, location information, rejection cause code).

The average time of a network problem resolution, which may represent an estimate of the network loss duration, depends on such parameters handled with the Network Rejection Event, for example, the average time network problem resolution=f("rejection cause code, device type, location information"), f meaning "function of".

Byway of example, cause codes contained in a Network Rejection Event may include: an "Illegal device" cause code that is supplied only when a device is made illegal while it was previously a legal device; a "GPRS services not allowed" cause code that is a limited service cause code and depends on the device type and the location; a "IMSI unknown in HLR" cause code that is supplied only when the IMSI (International Mobile Subscriber Identity) code is deleted from the HLR (Home Location Register) (for instance because phone bills were not paid) and is a permanent network problem.

Thus, a file that, in particular for each type of device, defines an average time of resolution of a network problem for a particular cause code in a current location can be used to address the issue of "fallback tuning." For example, if and when to switch to a fallback profile and whether to retry a previous profile that is still currently enabled.

Figure 3:
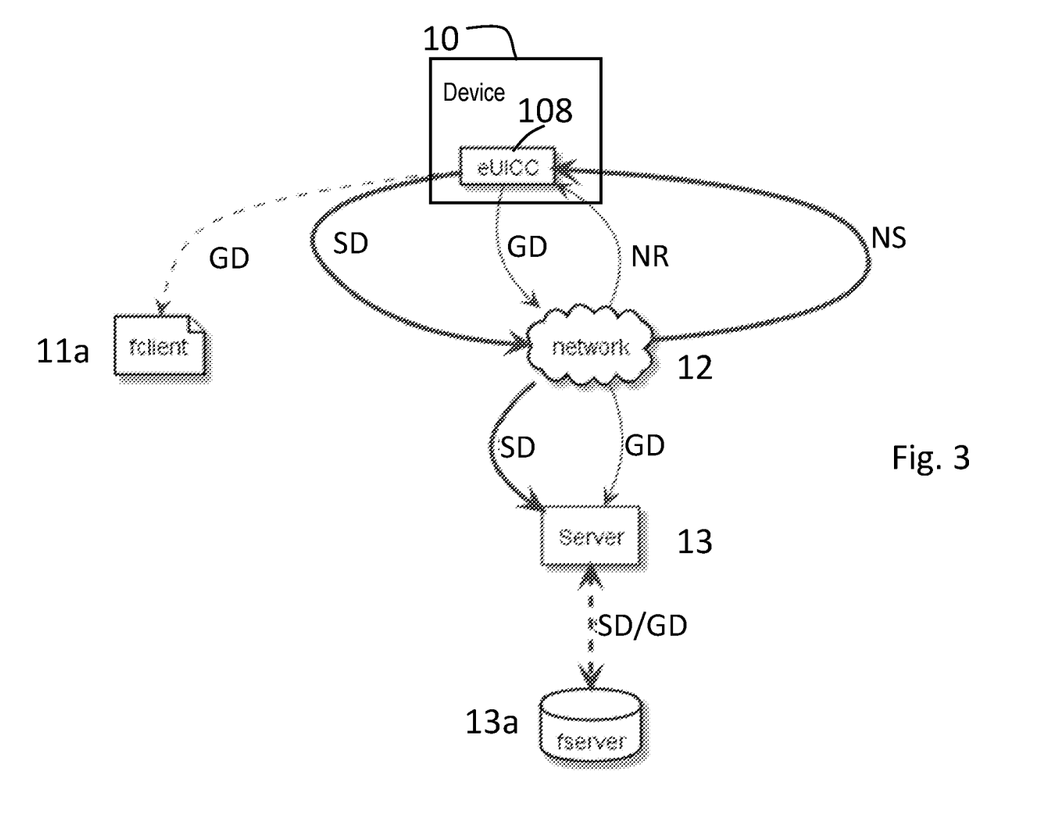
FIG. 3 is a schematic block representation of a system implementing the method according to embodiments.

FIG. 3 illustrates a schematic a system architecture implementing the method here described according to an embodiment. As shown, eUICC 108, which is embedded in a communication device (not shown) is configured to store data in a local file client fclient. The eUICC 108 communicates with a mobile communication network 12 according to mobile communication protocols. The eUICC 108 sends commands to the mobile communication network 12 including may comprise a send data command SD and a get data command GD, which may include parameters to send or to get (e.g., device type, cause code, location and others). The eUICC 108 also receives signals from the network 12 according to the mobile communication standard, (e.g., UMTS or LTE), in particular event signals such as a network rejection signal NR and a normal service signal NS. The mobile communication network 12 is configured to transfer the send data command SD and the get data command GD to a server 13 that manages a database 13a comprising a server file fserver. The server 13 forwards the send data command SD and get data command GD to the database 13a to store data and fetch data (e.g., values of parameters such device type, cause code, location, timestamp, measured duration). The values of these parameters may be stored, for example, in server file fserver in the database 13a.

Table 1 shows an example of 15-digit IMEI code (International Mobile Equipment Identity).

TABLE 1

| TAC | TAC | SERIAL NUMBER SN | CHECK DIGIT CD |
|---|---|---|---|
| 86 BODY IDENTIFIER BI | 916102 TYPE IDENTIFIER TI | 9912192 | 0 |

As shown, the 15-digit IMEI comprises a TAC (Type Allocation Code) code, in the first 8-digit of the IMEI code, which comprises a reporting body identifier BI (first two digits of the TAC) and a type identifier TI (next 6 digits) which indicates brand owner and device model type. In particular, only the type identifier TI is sent as device type identifier TY. A serial number SN of 6 digits represents a unique number assigned to individual devices by the manufacturer. Finally, a single check digit CD is placed at the end of the IMEI, which is a function of the other digits, and it is calculated by the manufacturer.

Figure 4:
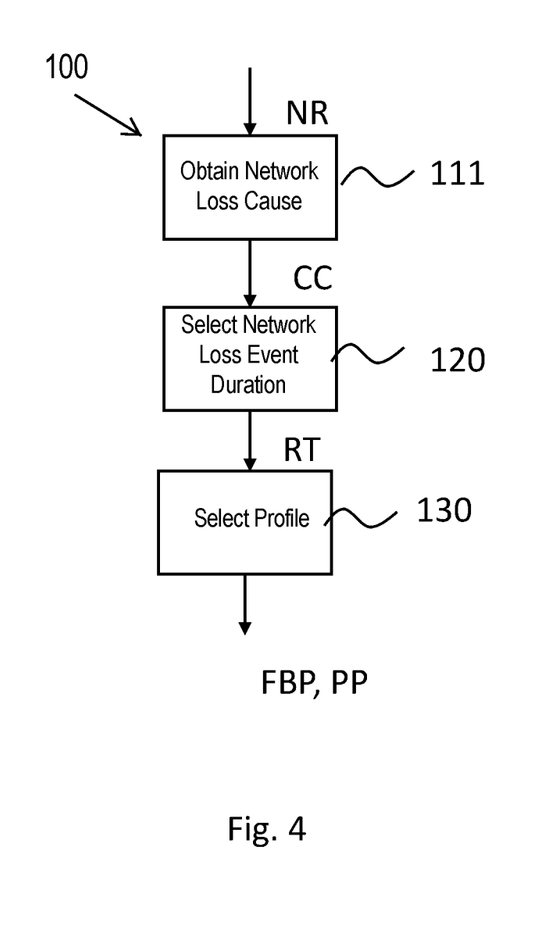
FIG. 4 is a flow diagram representation of a method according to embodiments.

FIG. 4 illustrates a flow diagram of an embodiment method 100 for managing in an integrated circuit card 108, such as an eUICC, operating in a communication device 10 configured to communicate with a mobile communication network 12, and to attach enabled profiles representing user subscriptions stored in said integrated circuit card 108 to the mobile communication network 12 in case of a network loss event. When a network loss event occurs and is signaled by a notification of network loss NR, for instance a Network Reject signal a current network loss cause CC is obtained in step 111. The notification of network loss NR may correspond to the Network Rejection Event signal from network 12 to the eUICC 108, which provides different information related to the current network problem. This information may include device identity TY, location problem L and a rejection cause code, which can be used as network loss event cause CC.

Next, in step 120, an estimate of the duration of the network loss event is selected among estimates RT of the duration of network loss event stored at the integrated circuit card 108 with the respective network loss event causes CC (also referred to as a network loss cause indices). The estimates of the duration of network loss event associated with network loss event causes CC may be obtained, for example, from the contents of the Network Reject signal NR. Such estimates may be stored as entries or records comprising a field cause code CC and estimates aRT in a local file client fclient, stored at the eUICC 108.

Next, in step 130, a profile stored in the integrated circuit card 108 (e.g., fallback profile FBP, or previous profile PP) is selected based on the value of the selected estimate of the duration of network loss event associated with the network loss event cause CC corresponding to the current loss event cause CC.

As indicated above, selection operation 130 may include evaluating based on the estimated network loss event duration that extracted from the local file client fclient. (e.g., whether the integrated circuit card 108 enables a fallback profile FBP according to the Fallback Mechanism, re-attaches the currently enabled profile PP in the integrated circuit card 108. If the network loss event duration is evaluated to be representative of a short temporary problem, in particular shorter than a given time duration threshold, re-attachment of the currently enabled profile PP is attempted. Otherwise, if the estimation of duration of a network loss event is evaluated as representing a not-temporary problem, in particular longer than a given time duration threshold, the integrated circuit card 108 switches to the fallback profile FBP.

Figure 5:
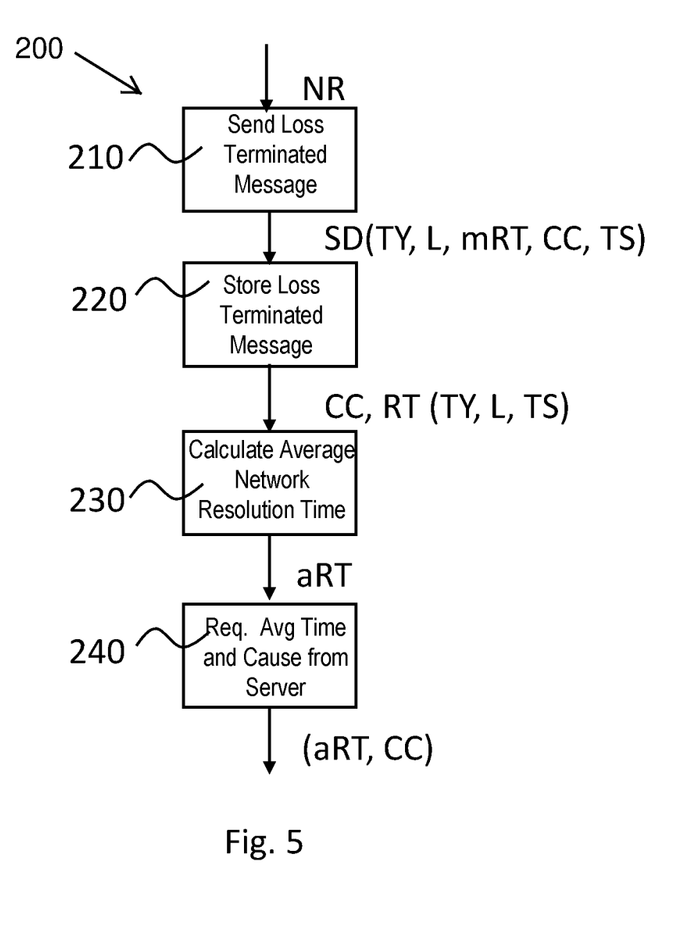
FIG. 5 is a flow diagram representation of an operation of the method according to embodiments.

FIG. 5 illustrates a method 200 of storing estimates RT of the duration of network loss event in the integrated circuit card 108.

In general, the method 200 is directed to performing a communication through communication network 12 between one or more integrated circuit cards 108 residing in respective communication devices 10 and a remote server 13 in a client server communication mode. Method 200 includes, in this client server communication context, sending (step 210) to said server 13 from one or more integrated circuit cards 108 of communication devices 10 attached to said communication network 12 at the end of a network loss event a network loss terminated message, such as a SEND DATA message SD, comprising the type TY of communication device, the indication CC of the cause of a network loss event, an area location L information and a measured duration mRT of the network loss event, and optionally also a timestamp TS that provides an indication of when the SEND DATA message SD is sent. The SEND DATA message may be sent upon receipt upon a receipt of a notification NS of normal service (e.g., connectivity is restored), such as NORMAL SERVICE event signal, from the network 12.

Figure 7:
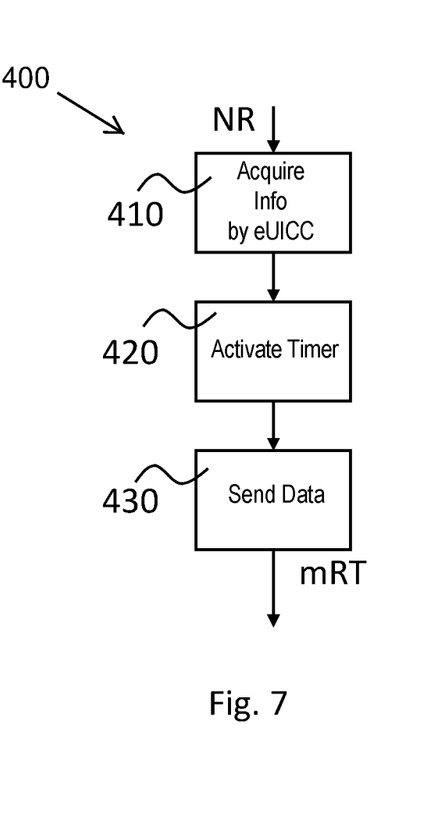
FIG. 7 is a flow diagram representation of a third operation of the method according to embodiments.

In various embodiments, profile selection step 130 of FIG. 3 can be performed according to the resolution time measuring procedure 400 shown in FIG. 7. Method 400 may be performed, for instance, by a client application stored and operating at integrated circuit card, in particular eUICC 108.

When the eUICC 108 receives the network loss notification signal NR, in particular the asynchronous notification "Network Rejection Event" indicating a loss of connectivity, the following information are acquired in a step 410 by the eUICC 108, for example, by the client application: device identity TAC, (e.g., device type TY), Location Information L, Routing Area Identification, Tracking Area Identification, and Rejection Cause Code CC. Next, timer TC at card 108 or at device 10 is activated in step 430. Upon reception of a normal service NS signal, for instance with the syntaxis NORMAL SERVICE (EVENT DOWNLOAD—LOCATION STATUS), the eUICC 108 stops the timer TC and sends (step 430) in a determined format accepted by the server 13 to the server 13 a message, by the SEND DATA command SD, for instance, comprising the TAC, the rejection cause code CC, the location information L, the measured duration mRT of the network loss and a time stamp (e.g., SEND DATA(TAC, rejection cause code, location information, measured duration of network loss, timestamp TS). If a timeout occurs, (e.g., no normal service NS signal is received by the eUICC 108, for instance within a given timeout period), no information is sent to the server 13 (e.g., no SEND DATA messages are sent to the server 13).

Turning back to FIG. 5, after step 210, the server 13 is configured for storing (step 220) the network loss terminated messages (e.g., their content) from the plurality of integrated circuit cards 108 in a database 13a comprised in the server 13 or accessible from it, as entries, grouped by type of device TY and area location L.

In an embodiment, the server 13 is connected to the mobile network 12 operator and has thus knowledge of the location area position and can update data for cells (a cell is geographically associated with an antenna, more location areas belong to a cell). Thus, for each message (e.g., client send data command SD) received from a client eUICC 108 in a specified location area L, the server 13 may convert the information of the specified location area L in terms of the related cell/antenna.

Preferably a server file fserver in database 13a may be updated in a circular way with the feedback of the eUICC 108, through respective mobile communication devices 10, in the client send data commands SD, which include device type TY, cell C, cause code CC and resolution time ts. The device type as indicated in Table 1 is represented by the TAC code, the cell MC (e.g., the identifier of the mobile communication cell in which the device is located), and the cause code CC indicating the cause of the loss of network, and RT indicating the resolution time of a given cause code CC in a device type TY. For instance, the server file fserver comprises n database records or entries R1 . . . Rn each comprising values in the field TY, MC, CC, RT, such as:

R1: Device type TY=a, cell L=d, cause code CC=i, resolution time RT=ts (resolution time of cause code CC=i in a);
R2: device type TY=a, cell L=d, cause code CC=i, tt (resolution time of cause code CC=i in a);
R3: device type TY=a, cell L=d, cause code j, tm (resolution time of cause code j in a) . . . .
Rn: device type TY=b, cell MC=b, cause code CC=z, tn (resolution time of cause code z in b),
where a, b are device types, d is a location area express in term of cell to which the location area belongs, i, j, z are cause codes (e.g., 'Illegal server' and others as indicated above, or other codes conveying the same information).

Next, in step 230, server 13 is configured for calculating an average time aRT of network resolution for said cause CC, which is calculated over the entries R1 . . . Rn in the server file fserver, of a same group corresponding to the type TY of device 10 and location L within the mobile communication network 12. Average times aRT are calculated taking into account the average time of that cause code CC resolution for that type of device TY in a cluster area L where the device 11 is positioned.

In various embodiment, steps 220, 230 may be managed by a server side application.

Next, in step 240, the integrated circuit card 108 at a determined update time (e.g., at startup) requests from the server 13 on the basis of its respective type of device TY and area location L, values of average time aRT and corresponding cause CC corresponding to its device type TY) and location L, which are then, upon reception at card 108, stored as estimates RT of the duration of network loss event stored at the integrated circuit card 108 in association with the corresponding network loss event cause CC in the integrated circuit card 108. The client (e.g., eUICC 108) can update the local file client fclient with a request to server 13 by a get data GD command which comprises the device type TY and the location area of the eUICC 1109, e.g. GET DATA(TY, L).

Thus, at a determined update time (e.g., startup of the device 10 or a profile switch), the eUICC 108 sends a message to the related server 13 to update the local file client fclient based on the last network problems in the cluster area where the location area L of the device 10 belongs, sending a get data command with the type of device TY and location L, e.g. GET DATA(type of device TY, location area L).

Timestamp information TS may be used by the server 13 to discard the SEND DATA command if the network loss is due to a well-known network breakdown (for example power cut) to order SEND DATA messages from several eUICC devices (in the network the order and the time of message reception is not predictable).

Figure 6:
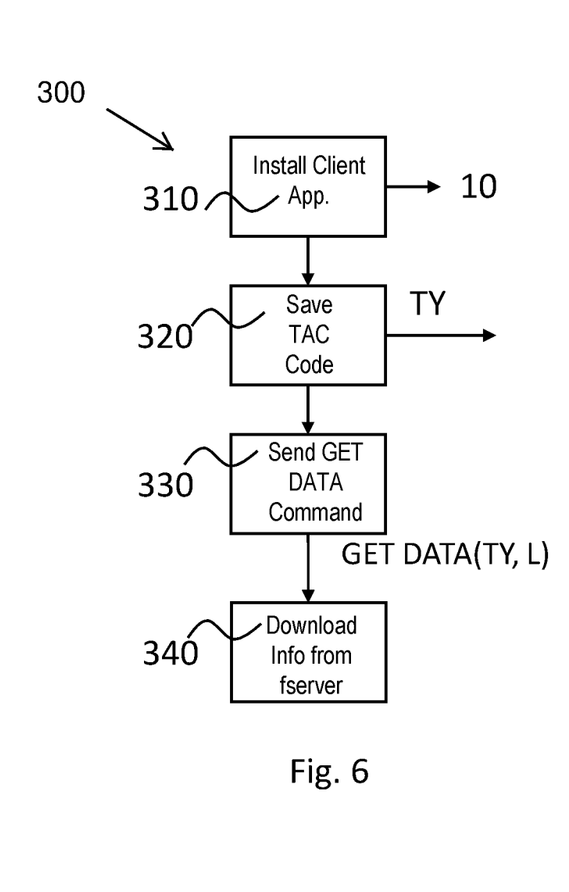
FIG. 6 is a flow diagram representation of a second operation of the method according to embodiments method according to embodiments.

The client application is installed by an installation procedure 300 shown in FIG. 6 which includes: installing (step 310) the client application (e.g., store the application CLAT and enable its operation within the mobile device operation system); saving (step 320) the TAC code from the IMEI code to identify the device (e.g., TY as shown in Table 1 corresponds to the initial eight-digit portion of the 15-digit IMEI used to uniquely identify wireless devices); and sending (step 330) from the eUICC 108 in a prescribed format a get data command GD, comprising the device identification such as the TAC, and the location area (e.g., GET DATA (TAC, location)) to the server 13 related to the current profile enabled in the device 15 and eUICC 11. The server 13 fetches the server file fserver database 13a for the device 15 type specified in the TAC and for the cell or cluster or group of cluster related to the current location area of the device 15. Lastly, in step 340, information is downloaded from server 13 (e.g., from server file fserver) for the local file client fclient based on the device identification (e.g., TAC code, and current location area device L).

As indicated, the server 13 can work with different granularity of area to save space of the circular buffer (cell/cluster/group of cluster). In embodiments, information of location area L sent in the commands SEND DATA and GET DATA by the eUICC 108 is related to the position of the device. The server 13 may convert this information on the position of the device in the related cell/cluster/group of cluster to fetch entries of its server file fserver from the database 13a.

Thus, the advantages of embodiments described hereinabove are clear. For example, using the estimates of the duration of network loss allows fir improvement of the network coverage. Also, the embodiments described herein allows for an optimization of the fallback mechanism specific implementation using available statistics based on network rejection events of several devices that take into account the type of devices, the location area, the type of network error causing the loss of connectivity.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A method, comprising:
receiving a notification of a network loss from a mobile communication network, the notification comprising a current network loss cause;
selecting a network loss event duration estimate among a plurality of network loss event duration estimates stored on an integrated circuit card and indexed according to a corresponding plurality of network loss cause indices;
selecting a stored profile of a plurality of stored profiles on the integrated circuit card based on the selected network loss event duration estimate, wherein the plurality of stored profiles are associated with user subscriptions; and
attaching to the mobile communication network using the selected stored profile when the selected stored profile is not already enabled.

2. The method of claim 1, wherein the integrated circuit card is an embedded Universal Integrated Circuit Card (eUICC).

3. The method of claim 1, further comprising:
sending, by the integrated circuit card in a client-server communication mode, a network loss terminated message to a remote server, the network loss terminated message comprising: a type of communication device, an indication of a cause of a network loss event, area location information, a duration of the network loss event, and a timestamp.

4. The method of claim 3, further comprising:
storing, by the remote server, network loss terminated messages from a plurality of integrated circuit cards in a database grouped by the type of the communication device, and a location within the mobile communication network; and
calculating, by the remote server, an average of network loss event durations recorded in the stored network loss terminated messages from the plurality of integrated circuit cards corresponding to the type of the communication device and the location within the mobile communication network.

5. The method of claim 4, further comprising:
ordering, by the remote server, the network loss terminated messages according to their respective timestamps; and
discarding network loss terminated messages having timestamps within a time range of a known network loss.

6. The method of claim 1, further comprising:
requesting, by the integrated circuit card at a determined update time, the plurality of network loss event duration estimates, the corresponding plurality of network loss cause indices, and corresponding device types and locations;
receiving, by the integrated circuit card, the plurality of network loss event duration estimates, the corresponding plurality of network loss cause indices, and the corresponding device types and locations; and
storing, by the integrated circuit card, the plurality of network loss event duration estimates, the corresponding plurality of network loss cause indices, and the corresponding device types and locations.

7. The method according to claim 6, further comprising:
updating a client file on the integrated circuit card with the received plurality of network loss event duration estimates, the received corresponding plurality of network loss cause indices, and the received corresponding device types and locations, wherein the client file comprises a plurality of entries comprising a network loss cause index of the corresponding plurality of network loss cause indices and a network loss event duration event estimate of the plurality of network loss event duration estimates corresponding to a device type and location of the received corresponding device types and locations, wherein the network event duration event estimate is based on an average time of network resolution for a cause associated with the network loss cause index.

8. The method according to claim 1, wherein selecting the stored profile comprises selecting between attaching a fallback profile and re-attaching a currently enabled profile based on the selected network loss event duration estimate.

9. The method according to claim 8, wherein selecting the stored profile comprises:
selecting the currently enabled profile when the selected network loss duration event estimate is less than a time duration threshold; and
selecting the fallback profile when the selected network loss event duration estimate is greater than the time duration threshold.

10. The method according to claim 1, further comprising:
activating a timer upon receipt of the notification of the network loss;
stopping the timer upon receipt of a notification of normal service to provide an elapsed time value from the timer; and
after stopping the timer, sending a message comprising a communication device type, an indication of a cause of the network loss, area location information, the elapsed time value.

11. A system comprising:
an integrated circuit card configured to:
receive a notification of a network loss from a mobile communication network, the notification comprising a current network loss cause;

select a network loss event duration estimate among a plurality of network loss event duration estimates stored on the integrated circuit card and indexed according to a corresponding plurality of network loss cause indices;

select a stored profile of a plurality of stored profiles on the integrated circuit card based on the selected network loss event duration estimate, wherein the plurality of stored profiles are associated with user subscriptions; and attach to the mobile communication network using the selected stored profile when the selected stored profile is not already enabled.

12. The system of claim 11, wherein the integrated circuit card is an embedded Universal Integrated Circuit Card (eUICC).

13. The system of claim 11, wherein the integrated circuit card is further configured to:

send a network loss terminated message to a remote server in a client-server communication mode, the network loss terminated message comprising: a type of communication device, an indication of a cause of a network loss event, area location information, a duration of the network loss event, and a timestamp.

14. The system of claim 11, wherein the integrated circuit card is further configured to:

request the plurality of network loss event duration estimates, the corresponding plurality of network loss cause indices, and corresponding device types and locations at a determined update time from a remote server;

receive the plurality of network loss event duration estimates, the corresponding plurality of network loss cause indices, and the corresponding device types and locations from the remote server; and store the plurality of network loss event duration estimates, the corresponding plurality of network loss cause indices, and the corresponding device types and locations.

15. The system of claim 14, wherein the determined update time is a startup time of the integrated circuit card.

16. The system of claim 11, wherein the integrated circuit card is further configured to:

update a client file on the integrated circuit card with the received plurality of network loss event duration estimates, the received corresponding plurality of network loss cause indices, and the received corresponding device types and locations, wherein the client file comprises a plurality of entries comprising a network loss cause index of the corresponding plurality of network loss cause indices and a network loss event duration event estimate of the plurality of network loss duration estimates corresponding to a device type and location of the received corresponding device types and locations, wherein the network event duration event estimate is based on an average time of network resolution for a cause associated with the network loss cause index.

17. The system of claim 11, wherein the integrated circuit card is configured to select the stored profile by selecting between attaching a fallback profile and re-attaching a currently enabled profile based on the selected network loss event duration estimate.

18. The system of claim 11, further comprising a wireless communication interface coupled to the integrated circuit card, wherein the integrated circuit card is configured to attach to the mobile communication network via the wireless communication interface.

19. A system comprising:

a remote server configured to:

receive, from a plurality of integrated circuit cards operating in a client-server communication mode, network loss terminated messages, each network loss terminated message of the network loss terminated messages comprising: a type of communication device, an indication of a cause of a network loss event, area location information, a duration of the network loss event, and a timestamp;

store network loss terminated messages in a database grouped by the type of the communication device, and a location within a mobile communication network; and calculate an average of network loss event durations recorded in the stored network loss terminated messages from the plurality of integrated circuit cards corresponding to the type of the communication device and the location within the mobile communication network.

20. The system of claim 19, wherein the remote server is further configured to:

order the network loss terminated messages according to their respective timestamps; and discard network loss terminated messages having timestamps within a time range of a known network loss.

* * * * *